United States Patent [19]

Brandenstein et al.

[11] Patent Number: 4,525,082
[45] Date of Patent: Jun. 25, 1985

[54] SEALING RING ASSEMBLY FOR ROLLING BEARINGS

[75] Inventors: Manfred Brandenstein, Eussenheim; Roland Haas, Hofheim; Wolfgang Friedrich, Schweinfurt; Rüdiger Hans, Niederwerrn, all of Fed. Rep. of Germany

[73] Assignee: SKF Kugellagerfabriken GmbH, Schweinfurt, Fed. Rep. of Germany

[21] Appl. No.: 615,780

[22] Filed: May 31, 1984

[30] Foreign Application Priority Data

Jun. 3, 1983 [DE] Fed. Rep. of Germany ....... 3320063

[51] Int. Cl.³ .......................... B21D 53/10; F16J 15/34
[52] U.S. Cl. ...................................... 384/138; 277/48; 277/182; 277/179; 384/147
[58] Field of Search .............. 277/48, 50, 83, 182, 277/185, 179, 235 B; 384/138, 147

[56] References Cited

U.S. PATENT DOCUMENTS

| | | | |
|---|---|---|---|
| 2,755,113 | 7/1956 | Baumheckel | 277/179 |
| 3,414,341 | 12/1968 | Murphy | 384/147 |
| 3,727,279 | 4/1973 | Abel | 384/138 |
| 3,743,305 | 7/1973 | Berens et al. | 277/182 |
| 3,746,351 | 7/1973 | Tucker | 277/48 |
| 3,924,861 | 12/1975 | Szepesuary | 277/185 |
| 4,114,898 | 9/1978 | Bainard et al. | 277/179 |
| 4,345,770 | 8/1982 | Seeh | 277/48 |
| 4,421,326 | 12/1983 | Drygalski | 277/83 |
| 4,426,094 | 1/1984 | Antonini | 277/50 |
| 4,484,752 | 11/1984 | Bentley | 277/83 |

Primary Examiner—Robert I. Smith
Attorney, Agent, or Firm—Eugene E. Renz, Jr.

[57] ABSTRACT

Sealing ring for radial rolling bearings with an outer race and an inner race and rolling bodies in the gap between them, consisting of a ring body of elastic material bridging the gap with, at one radial end, at least one sealing lip or the like sliding along a contact surface of the outer race or inner race and with, at its opposite end, a hub section supported on a seating surface of the inner or outer race and a stiffening plate incorporated into the ring body with a radial web section and, in the hub section, a collar section connected to the outer edge of the web section facing the hub, characterized in that the collar section of the stiffening plate is formed both by axially inward-bent and axially outward-bent tabs of the outer edge of the stiffening plate.

10 Claims, 9 Drawing Figures

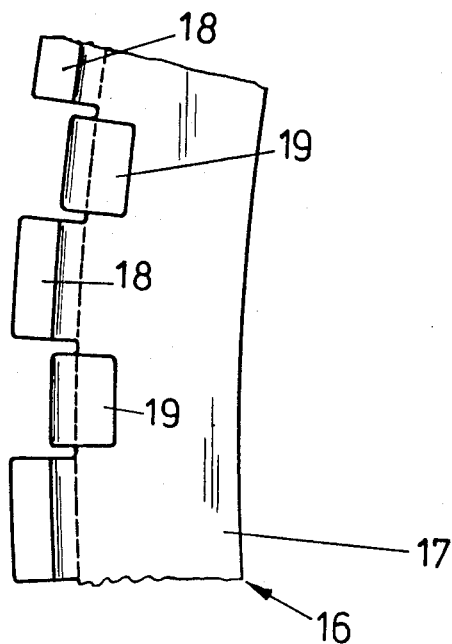
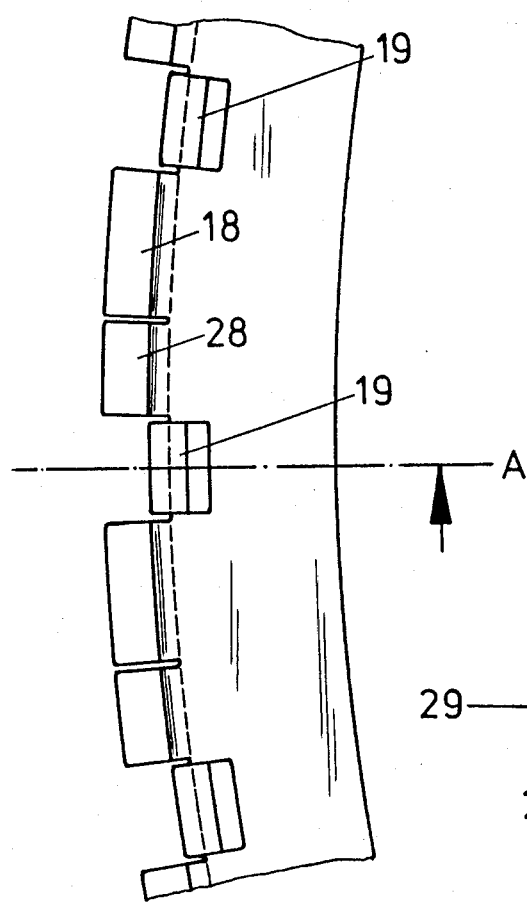
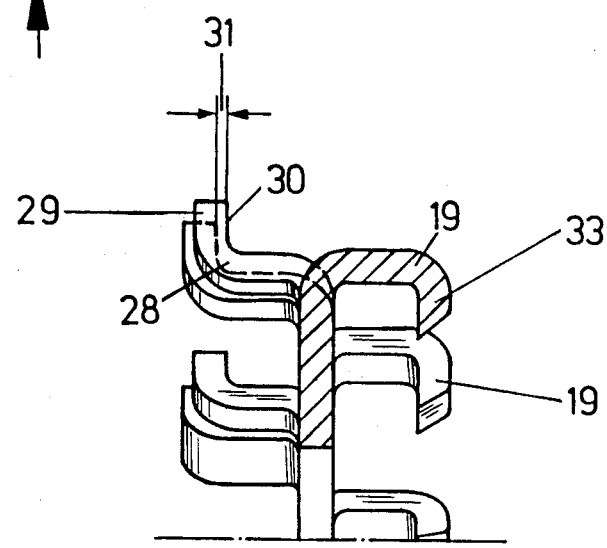

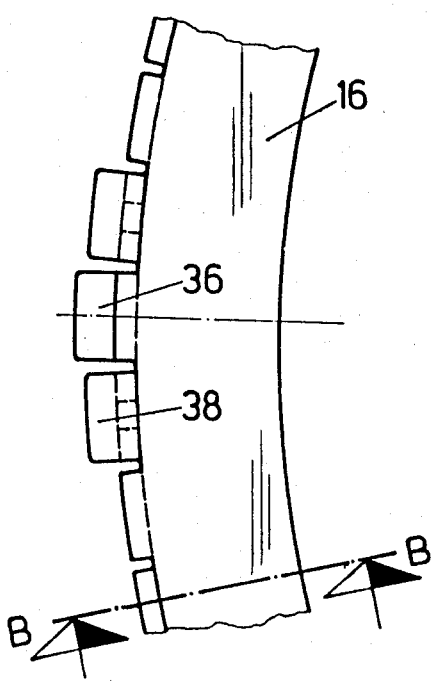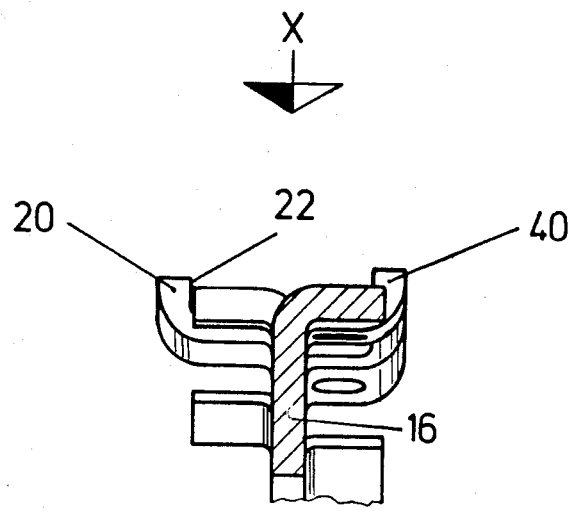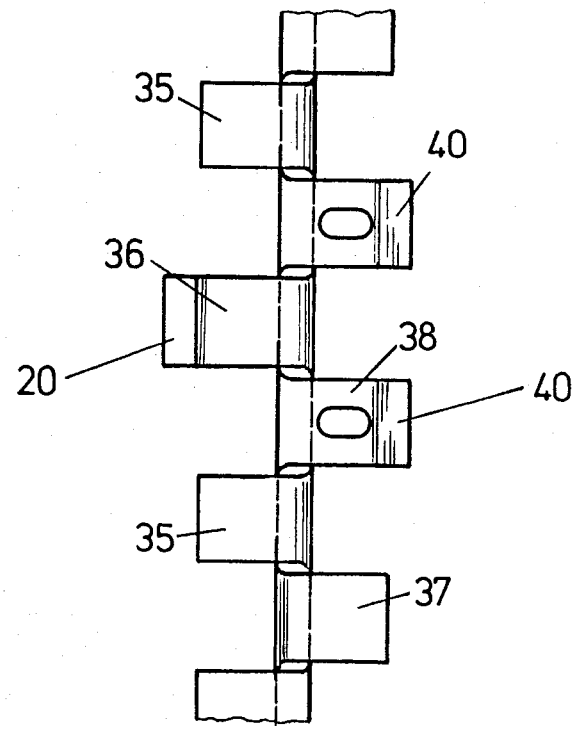

SEALING RING ASSEMBLY FOR ROLLING BEARINGS

BACKGROUND OF THE INVENTION

The present invention relates to improvements in sealing rings for rolling bearings.

Sealing rings of the general type to which the present invention relate which include a stiffening plate having an axially inwardly directed collar in the hub section of the ring body are not new per se and a typical sealing ring of this type is shown in U.S. Pat. No. 3,989,259. A drawback in this known-type sealing ring is that the hub section at its inner elastically resilient axial end must be firmly seated on a relatively narrow seating surface of the outer race. Accordingly, it has been found that this type of sealing ring can be easily tilted and installed at an angle when it is assembled in the bearing assembly. These conditions, that is, a tilted position of the sealing ring in the outer race, however, are extremely harmful since the sealing lip of the ring body can bind on the sliding or sealing surface and are, thus, incapable of providing an adequate seal. Furthermore, when this known-type of sealing ring is firmly seated on the seating surface in the bore of the outer race, bending forces develop which exert a one-sided bending force on the collar section of the stiffening plate. These bending forces cause axially outward bulging of the web section of the stiffening plate and for this reason as well, the accurate positioning of the sealing lips in the rolling bearing is not always guaranteed.

SUMMARY OF THE INVENTION

To this end, the sealing ring assembly of the present invention consists of an annular ring body of elastic material which bridges the gap or annular space between the inner and outer raceways, the ring body having at least one sealing lip or the like in sliding contact with one of the confronting raceways and a hub section supported on a seating surface of the opposing raceway. A stiffening plate is incorporated in the ring body having a radial web section and in the hub section, a collar is connected to the outer edge of the web section facing the hub. The collar of the stiffening plate is formed both by axially inwardly directed and axially outwardly directed tabs at the outer edge of the stiffening plate. By reason of this construction, the seal assembly can be reliably mounted on its seating surface on either the outer or inner raceway so that the sealing lips of the ring body are always accurately positioned in good sealing contact. More specifically, with the sealing ring of the present invention, the hub section of the ring body is resilient in the radial direction at its two axial ends and in the intermediate area it is supported by a relatively stiff and non-yielding web section. Thus, when the sealing ring is pressed axially into place and the hub section is firmly seated on its seating surface, the radially inwardly directed tabs of the stiffening plate are bent in one direction and the radially outwardly directed tabs are bent in the opposite direction. The outer edge of the web section on which the tabs are formed, thus, acquires bending moments which act in opposite direction. The bending moments acting at the edge thus at least partially cancel one another so that the web section on which the sealing lips are firmly held retains its prescribed shape (i.e. it is flat even after installation of the sealing ring).

The sealing ring assembly of the present invention is characterized by novel features of construction and arrangement wherein at least some of the radially directed tabs of the stiffening plate have bending elasticity and are arranged so as to press the hub section of the ring body elastically against the seating surface of the raceway with which it confronts with a predetermined radial pretension. By reason of this design, the radial surface pressures between the hub section and the associated seating surface can be adjusted by means of the elastic force of the flexible tabs of the stiffening plate producing certain advantages. For example, the material of the ring body, i.e. an elastomer, used to produce the soft elastic sealing lips can be made so that they are relatively resilient without interfering with the firm seating of the hub section on its seating surface on its inner or outer raceway.

The tabs are preferably provided at their axial ends with a radial retainer section which engages in a radial recess in the seating surface of the inner or outer raceway. In this manner, the sealing ring is locked in place since the tab carrying the retainer section can be plastically deformed into the radial recess of the seating surface. The tab can also be designed with a certain elasticity so that the retainer section snaps into the radial recess when the sealing ring is installed. This is achieved by reason of the fact that at least one of the retainer sections made of the stiffening plate may be braced against the side wall of the radial recess in the inner or outer raceways in the circumferential and/or axial direction.

In accordance with another feature of the present invention, several retainer sections of the stiffening plate tabs can be provided which are braced in the axial direction wherein the retaining projections of the tabs jointly engage with a radial recess in the form of an annular groove in the seating surface of the inner or outer raceway and are, therefore, braced in the axial direction against one or both side walls. This arrangement provides a sealing ring which is of comparatively simplified construction and can be held firmly in place by engagement of the retainer sections in an easy-to-form radial recess in the seating surface of the inner or outer raceways.

In accordance with another feature of the present invention, the tabs are braced directly against a side wall of the groove in the inner or outer raceway and indirectly against the opposing wall of the same recess under axial pretension by reason of the elastically compressible material of the hub section of the ring body. In this manner, the sealing ring is held non-elastically in one axial direction and elastically in the opposite axial direction by virtue of the elastically compressible material of the hub section. In this fashion, the elastic material of the hub section compresses the retaining projections with axial pretension against the side walls of the annular recess in the raceway without play. Simultaneously, the elastically compressible material of the hub section tightly contacts the side wall of the recess along its entire periphery thereby providing a good seal against ingress of dust or dirt which may intrude between the hub section of the ring body and the side wall of the groove into the interior of the bearing. Preferably, the retainer section of at least one of the tabs of the stiffening plate is braced against one or both circumferentially extending opposing boundary walls of the recess and in this manner, the sealing ring is firmly seated in place and prevented from turning. The body of the sealing ring may also be provided at the outer axial end of the hub section with at least one elastic projection which extends radially into the annular space between the raceways and the sealing lips which slide on the contact surface of a thrust ring connected to the raceways of the bearing. The thrust ring has a radial leg and is designed so that with its radial leg it can be snapped radially inwards into place behind the projections of the hub section. In this manner, the sealing ring may be assembled into a unit with a thrust ring providing the contact surfaces for the sealing lips and the entire assembly can be installed easily into the bearing without damaging the seals since the assembly can be installed by means of tools without contacting and causing possible damage to the sealing lips.

In accordance with another feature of the present invention, the thrust ring is anchored with particular rigidity in the sealing ring since they may be formed at least partially by radial end sections of one or more of the tabs of the stiffening plate.

BRIEF DESCRIPTION OF THE DRAWINGS

These and other objects of the present invention and the various features and details of the operation and construction thereof, are hereinafter more fully set forth with reference to the accompanying drawings, wherein:

FIG. 2 is a partial side view of the stiffening plate of the sealing ring;

FIG. 4 is a partial side view as viewed from the outside showing the stiffening plate of the sealing ring illustrated in FIG. 3 in the non-embedded state;

FIG. 5 is a sectional view taken along lines A—A in FIG. 4;

FIG. 7 is a partial side view of the stiffening plate of the sealing ring shown in FIG. 6;

FIG. 8 is a sectional view taken along lines B—B of FIG. 7; and

FIG. 9 is a partial top view of the stiffening plate as viewed in the direction of the arrow "X".

DESCRIPTION OF THE PREFERRED EMBODIMENT

Figure 1:
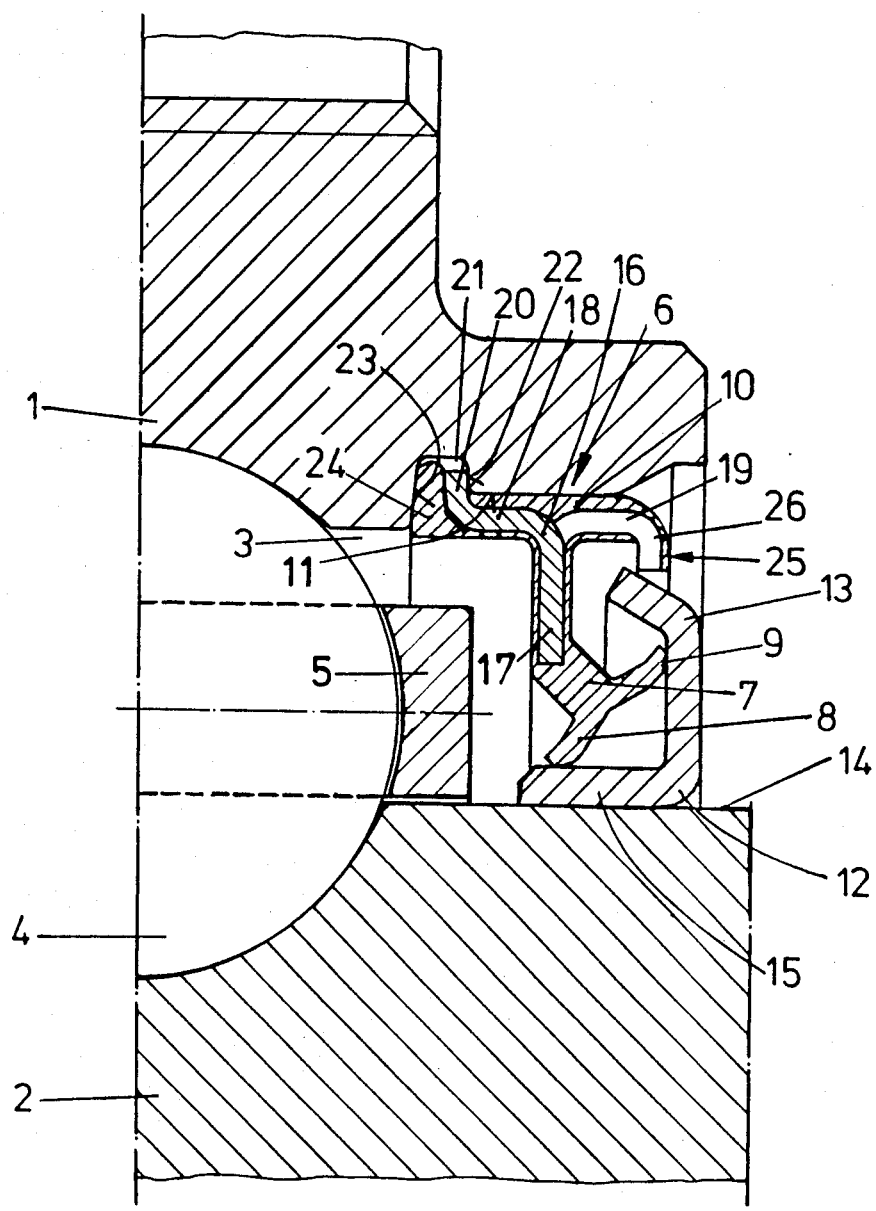
FIG. 1 is a longitudinal sectional view through a rolling bearing incorporating a seal assembly in accordance with the present invention.

Referring now to the drawings and particularly to FIG. 1 thereof, there is shown a typical rolling ball bearing assembly incorporating a sealing ring assembly in accordance with the present invention. The bearing comprises the usual outer and inner rings 1 and 2 which are radially spaced apart to define an annular space or gap 3 for a plurality of rolling elements, in the present instance, balls 4, which are circumferentially spaced by a conventional cage 5.

A sealing ring assembly generally designated by the numeral 6 bridges the gap 3 and seals it off laterally from the outside. The sealing ring assembly 6 as illustrated has an annular ring-shaped body 7 made of an injection moldable elastomeric matrial which has at its inner peripheral edge bifurcated sealing lips 8, 9. At its outer radial extremity, the ring body has an annular hub section 10 having an outer peripheral surface which is firmly seated in the cylindrical seating surface 11 in the bore of the land surface spaced axially outwardly from the outer raceway 1a.

In the present instance, the sealing lips 7, 8 engage the angularly disposed walls of a thrust ring 12 press fitted on the land surface 14 of the inner ring 2. The thrust ring 12 is formed from sheet metal and is of generally L-shaped cross section including a radial leg 13, the inner surface of which forms a contact surface for the axially directed sealing lip 9 and an axial leg 15, the cylindrical lateral surface of which provides a contact surface for the radially directed sealing lip 8 of the ring body 7.

The sealing ring assembly further includes a stiffening plate 16 made of sheet metal which is embedded in the elastomeric ring body 7 by an injection molding process. As illustrated in FIG. 1, the stiffening plate 16 is of generally T-shaped cross section including a radial web section 17 and a collar section 17a which faces the hub section 10. The collar section comprises a series of tabs 18 projecting axially inwardly from the web section and a plurality of tabs 19 which extend axially outwardly thereof. As can thus be seen in FIG. 2, adjacent tabs 18, 19 are bent in opposite direction to provide an alternate arrangement of inwardly and outwardly directed tabs at the outer radial edge of the stiffening plate 16. The tabs are elastic and function to press the resilient elastomeric plastic of the hub section 10 against the cylindrical seating surface 11 of the outer race with radial pretension. The tabs of the stiffening plate 16 are provided at their terminal edges with radially directed retainer sections. For example, the tabs 18 have radially outwardly directed retainer sections 20 which engage in an annular recess 21 in the seating surface 11 of the outer race. The retainer sections 20 as illustrated have an axially outwardly facing flat locking surface 22 which is exposed and not embedded in the elastomeric material so that it extends beyond the lateral surface of the hub section 10. However, as illustrated, between the retainer section 20 and the axially outwardly facing side wall 23 of the radial recess 21, is a ring-shaped axially compressed elastomeric ring 24 which presses the locking surface 22 of the individual retainer sections 20 against the axially inwardly facing side wall of the recess 21 with pretension. Accordingly, the tabs 18 are held firmly in place in the recess 21 without axial play and their retainer sections 20 are placed directly on the inward facing side wall 21a of recess 21 and indirectly against the opposite side wall 23 of the same recess by means of the elastically compressed ring section 24. In the present instance, the outer axial end of the hub section 10 of the ring body has a radial rib-like projection 25 which together with the radially inwardly directed portions 26 of tabs 19 projects radially into the gap 3. By reason of the soft elastic properties of the elastomer and the bending elasticity of the tabs 19, this projection 25 is resilient in the outward radial direction. The radial leg 13 of the thrust ring 12 which is snapped into the sealing ring 6 under elastic deformation of projection 25 engages axially behind projection 25. Thus, the thrust ring 12 is integrated and forms an inseparable unit with the sealing ring assembly 6.

Figure 3:
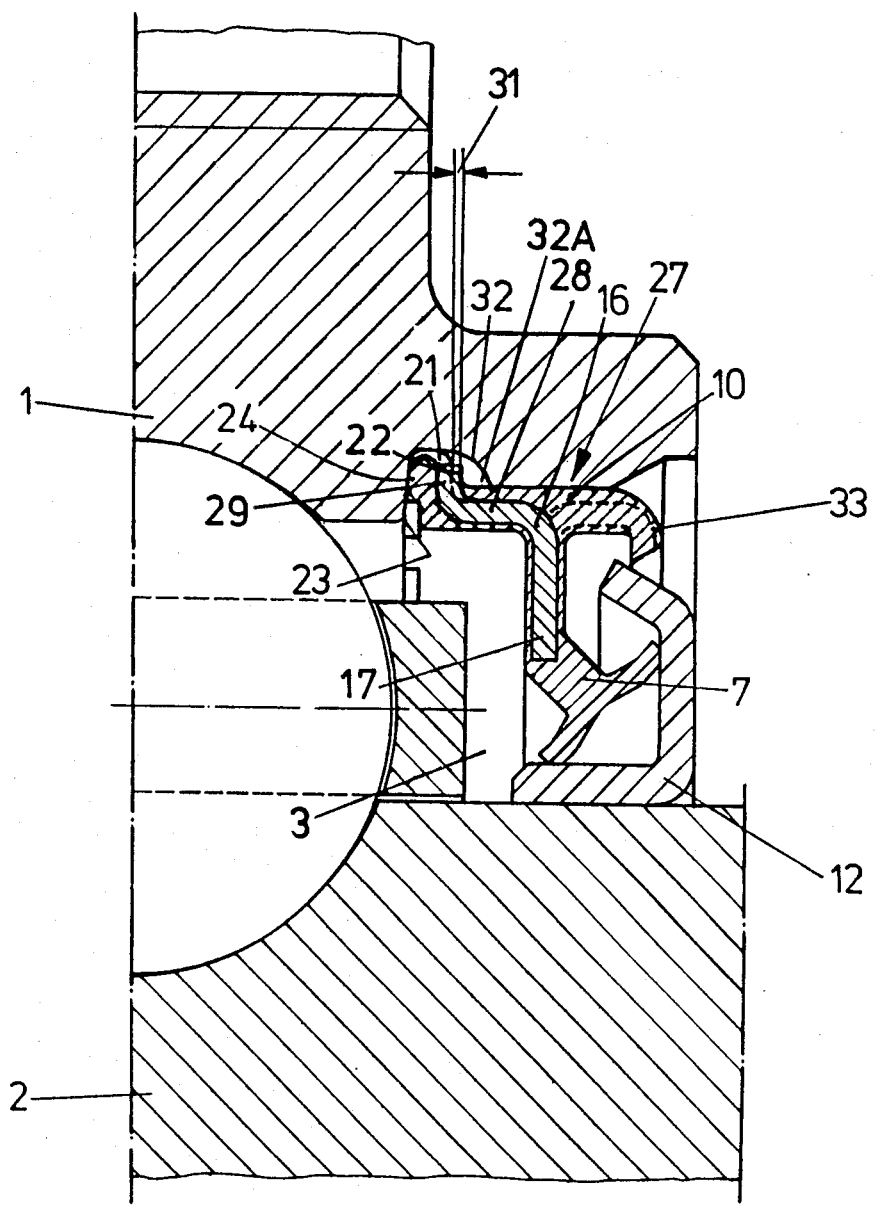
FIG. 3 is a fragmentary longitudinal sectional view showing a modified form of sealing ring assembly in accordance with the present invention.
Figure 6:
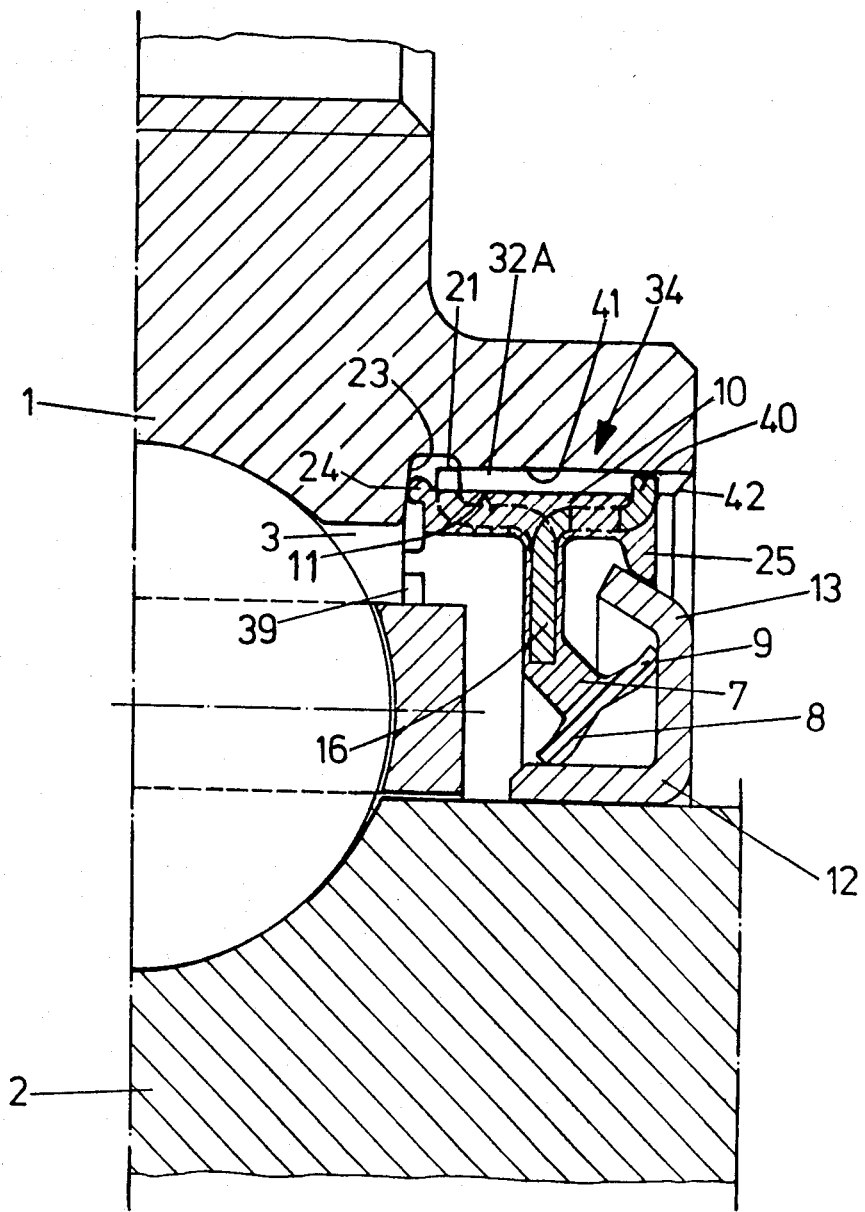
FIG. 6 is a fragmentary longitudinal sectional view through a rolling bearing assembly with still a further modified sealing ring assembly in accordance with the present invention.

There is shown in FIGS. 3, 4 and 5 a bearing assembly incorporating a modified sealing ring assembly 27 in accordance with the present invention. The sealing ring assembly is generally similar in overall configuration to that shown in FIG. 1. Therefore, the sealing ring assembly 27 also has a ring body 7 with two sealing lips 8, 9 which slide on a thrust ring 12. A stiffening plate 16 is also embedded in the sealing ring body 7 and has a radial web section 17 and a collar section formed integrally therewith. Note that the collar section has both axially inwardly directed and axially outwardly directed tabs 18, 19. In the present instance, however, the tab arrangement is such that there are adjacent pairs of radially inwardly bent tabs 18, 28 in adjacent side-by-side array in the circumferential direction. One tab 28 of the two adjacent tabs carries a retainer section 29 having an outwardly facing flat contact surface 30 displaced axially outwardly by a predetermined distance 31 relative to the flat contact surface 20a of the retainer section 20 of the adjacent tab 18.

As illustrated, the retainer section 29 of each axially inwardly bent tab 28 engages in an annular recess 32 in the inward facing side wall of the radial recess 21 in the outer ring 1. The recess 32 represents an axial expansion of the radial recess 21 so that the contact surface 30 in the installed position of the sealing ring does not contact with the base of the axial recess 32. The axial recess 32 has a pair of boundary walls 32a which face each other in the circumferential direction. In this manner, the retainer section is supported against the boundary walls 32a of the axial recess 32.

The elastically compressed ring 24 of the inner end of the hub section 10 presses the contact surface 22 of the retainer section 20 with a predetermined pretension against the axial inwardly facing side wall of the recess 21. The outer axial end of the hub section 10 includes a radially inwardly facing rib-shaped projection 25 having sections stiffened by means of a radially inwardly bent end section 33 of the tabs 19.

FIGS. 6–9 inclusive show a further modification of sealing ring 34 in accordance with the present invention. This embodiment is generally similar to those described above and includes a ring body 7 made of elastomeric material having a stiffening plate 16 of sheet metal embedded therein. The collar section of the stiffening plate 16 is formed by axially inwardly bent tabs 35, 36 and axially outwardly directed tabs 37, 38 which are located at the outer radial edge of the stiffening plate 16. (SEE FIG. 9) These sealing lips 8, 9 of the sealing ring body 7 contact and slide on a thrust ring 12 which is press fitted on the annular land surface of the inner ring 2.

In the present instance, the sealing rings includes four additional circumferentially equispaced tabs 36, each having a radially outwardly projecting retainer section 20 at their outer axial edges (see FIGS. 8 and 9). The tabs 36 are formed at the circumference of the stiffening plate 16 at a distance of 90° from each other. In the assembled state of the sealing ring 34, the contact surfaces of the retainer section 20 are pressed by the elastically compressed elastomer 24 of the inner end surface of the hub section 10 against the axially inwardly facing side wall of the annular recess 21. The hub section 10 has on its axially inwardly facing end surface additional inwardly bent tabs 35 but they have no retainer section (see FIGS. 8 and 9). The tabs 35, 36 are rigid thereby acting as stiffening members for the hub section 10 of the sealing ring body 7. Further, as illustrated, there is an axially outwardly directed tab 38 formed on the stiffening plate 16 on both sides of the tab 36. This tab 38 has at its axial end a radially outwardly pointing retainer section 40. A radial opening 40a which is expanded in rhe axial direction is formed in each tab 38 so that this tab has a relatively high degree of bending elasticity.

Between the two adjacent tabs 38 of the four locations around the circumference of the stiffening plate 16 are additionally axially outward-bent tabs 37, but these tabs do not have a retainer section, and because they do not have openings, they are relatively inflexible (FIGS. 8 and 9).

When the sealing ring 34 is installed, the retainer section 40 of each flexible tsb 38 engages in a groove-shaped recess 41; this groove is machined in the seating surface 11 of the outer race 1 and traverses it in the axial direction, ending at the ring-shaped recess 21.

All edges of the retainer section 40 of the flexible tabs 38 are rounded off and/or beveled, so that the retainer section 40 slips without binding over the seating surface 11 of the outer race 1 during installation of the sealing ring 34 and can be snapped into the recess 41 of the seating surface 11. After installation of the sealing ring 34 in the radial ball bearing, the outer radial contour of the retainer section 40, together with the base and the boundary walls 32a of the recess 41, forms a tight sealing gap.

The radial leg 13 of thrust ring 12 snaps behind the lip-shaped projection 25 of the hub section. Before installation of the sealing ring 34 in the radial ball bearing, the ring can be assembled with the thrust ring 12 as an integral inseparable unit.

On installation of the sealing ring 34 with the associated thrust ring 12, the retainer sections 20 of the stiff tabs 36 are threaded in each case into a groove-shaped recess 41. At that point, a grip can be secured on the thrust ring 12 and the sealing ring 34, together with the thrust ring 12, can be pushed in axially into the gap 3. Each retainer section 40 contacts the beveled edge 42 of the outer race 1 and as a result of the elasticity of tabs 38 is shifted radially inward. At the same time, the elastomer material 24 of the inner axial end of hub section 10 is pressed against the side wall 23 and elastically compressed. The retainer section 20 of stiff tabs 36 comes to rest in the ring-shaped recess 21. The sealing ring 34 is finally turned either in one or the other direction until the retainer section 40 of one of the two adjacent tabs 38 snaps into the groove-shaped recess 41.

The sealing ring 34 can be removed easily from the radial roller bearing. First, the retainer sections 40 are pressed radially inward by means of a tool (not shown) which fits into the recess 41; in this way, these sections are lifted out of recess 41. Then the sealing ring 34 is pressed axially inward against the side wall 23 and simultaneously turned, until the retainer sections 20 of the stiff tabs 36 are axially opposite the groove-shaped recesses 41 and can snap into these recesses 41 as a result of the elastic compression of the elastomer material 24. In this way, the sealing ring 34 is released in the axial direction (bayonet joint). The sealing ring 34 can then be pulled out in the axial direction together with the thrust ring 12 from the gap 3.

The exemplary embodiments described above can be modified in their design without department from the scope of the invention. For example, the hub section of the ring body does not have to be seated on a seating surface of the outer race. Instead, it can be arranged on a surface which is on the inner race. The sealing lips of the ring body then slide on a contact surface connected with the outer race. If the fit of the hub section of the ring body on the seating surface is so tight that the sealing ring is held firmly enough in place that it cannot be pulled out axially or turned, the axially inward-bent and axially outward-bent tabs do not have to have retainer sections. In place of the sliding sealing lips, lips or projections which form one or more narrow sealing gaps with the opposite contact surface can also be formed on the ring body.

SUMMARY

A sealing ring 6 for radial bearings with an outer race 1 and an inner race 2 has a ring body 7 of elastic material with sealing lips 7, 8 bridge the gap 3 between the outer race 1 and the inner race 2 and a stiffening plate 16 incorporated into the ring body 7 with a collar section in the hub section 10 of the ring body 7.

In order that the sealing ring 6 can be securely fastened at its seating surface 11 in the outer race 1 or inner race 2 to ensure that the sealing lips 7, 8 or the like are always held firmly in their prescribed places, the collar section of the stiffening plate 16 is formed by axially inward-bent and axially outward-bent tabs 18, 19 on the outer edge of the stiffening plate 16.

What is claimed is:

1. A sealing ring assembly for rolling bearings having an outer race and an inner race and rolling elements in the gap between them, comprising a ring body 7 of elastic material bridging the gap with at least one sealing lip 8, 9 at one radial edge of said ring body in sliding contact with one of the races, a hub section 10 supported on a seating surface of the inner or outer race and a stiffening plate 16 incorporated into the ring body including a radial web section and, in the hub section, a collar section connected to the outer edge of the web section facing the hub, said collar section of the stiffening plate 16 being formed both by axially inwardly directed and axially outwardly directed tabs 18, 19, 28, 35, 36, 37, 38 at the outer edge of the stiffening plate.

2. A sealing ring assembly according to claim 1, wherein at least some of the tabs 18, 19, 28, 35, 37, 38 of the stiffening plate 16 have bending elasticity and are arranged so as to press the hub section 10 of the ring body 7 elastically against the seating surface of one of the races with radial pretension.

3. A sealing ring assembly according to claim 1 including at least one radial recess 21, 41 in the seating surface of one of the races and wherein at least one of the inwardly directed and/or outwardly directed tabs 18, 28, 36, 38 of the stiffening plate 16 has at its axial end a radial retainer section 20, 29, 40, which engages in said radial recess 21, 41.

4. A sealing ring assembly according to claim 3, wherein at least one of said retainer sections 20, 40 of the tabs 18, 36, 38 of the stiffening plate 16 is braced against a side wall 23 of said radial recess 21, 41 in the circumferential and/or axial direction.

5. A sealing ring assembly according to claim 4 including a plurality of retainer sections of the inwardly directed and/or outwardly directed tabs of the stiffening plate, said retainer sections being braced in the axial direction, and wherein the retaining projections 20, 29 of the inwardly directed or outwardly directed tabs 18, 28, 36 of the stiffening plate 16, which jointly engage with a radial recess 21 in the form of an annular groove in the seating surface of one of the races is braced in the axial direction against one or both side walls of the recess.

6. A sealing ring assembly according to claim 5, characterized in that at least some of the retainer sections 20 of the inwardly directed or outwardly directed tabs 18 of the stiffening plate 16 are braced directly against the inward-facing or outward-facing side wall and indirectly against the opposite wall of the said recess 21 under axial pretension by way of the elastically compressible material 24 of the hub section 20 of the ring body 7.

7. A sealing ring assembly according to claim 5, wherein the retainer section 29, 40 of at least one of the inwardly directed or outwardly directed tabs 28, 38 of the stiffening plate 16 is braced against one or both circumferentially opposing boundary walls 32a of said recess 32, in one of the races.

8. A sealing ring assembly according to claim 1, wherein the ring body 7 has on the outer axial end of its hub section 10 one or more elastic projections 25, 33, which project radially into the gap 3, and sealing lips 8, 9, which slide on the contact surfaces(s) of a thrust ring 12 connected to one of the races, said thrust ring also having a radial leg 13 and being designed so that, with its radial leg 13, it can be snapped radially inwards into place behind the projection(s) 25, 33 of the hub section 10.

9. A sealing ring assembly according to claim 8, wherein the projection(s) 25 of the hub section 10 of the ring body 7 are formed at least partially by radial end sections 26 of one or more axially outward-bent tabs 19 of the stiffening plate 16.

10. A sealing ring assembly according to claim 3, wherein the inner axial end of the hub section 10 of the ring body 7 is braced axially againstan axially outward-facing side wall 23 of the radial recess 21, said side wall projecting radially into the gap 3.

* * * * *